(No Model.) C. S. CHAMBERLAIN & J. MILLER.
S. C. CHAMBERLAIN, Administratrix of C. S. CHAMBERLAIN, Dec'd.
VEHICLE BRAKE.
No. 341,093. Patented May 4, 1886.
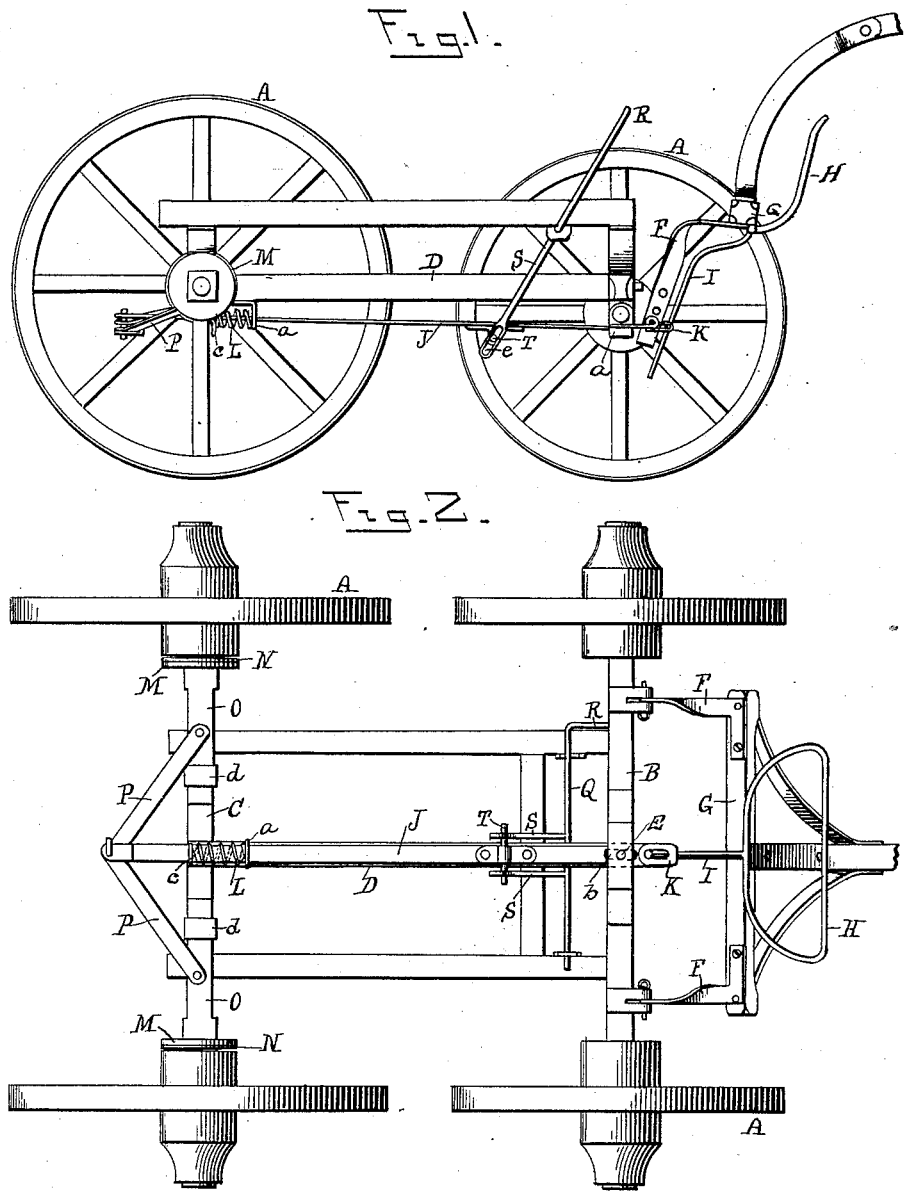
Witnesses:
Norris A. Clark.
Arthur D. Browne
Inventor:
Charles S. Chamberlain
Jeremiah Miller
by Attorneys:
Soulé & Co.

UNITED STATES PATENT OFFICE.

CHARLES S. CHAMBERLAIN, OF TREVORTON, AND JEREMIAH MILLER, OF READING, PENNSYLVANIA; SABINA C. CHAMBERLAIN ADMINISTRATRIX OF SAID CHARLES S. CHAMBERLAIN, DECEASED.

VEHICLE-BRAKE.

SPECIFICATION forming part of Letters Patent No. 341,093, dated May 4, 1886.

Application filed October 9, 1885. Serial No. 179,390. (No model.)

*To all whom it may concern:*

Be it known that we, CHARLES S. CHAMBERLAIN, a citizen of the United States, residing at Trevorton, in the county of Northumberland and State of Pennsylvania, and JEREMIAH MILLER, a citizen of the United States, residing at Reading, in the county of Berks and State of Pennsylvania, have invented certain new and useful Improvements in Vehicle-Brakes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention consists in a brake for vehicles which may be automaticatly applied by the horse when holding back the vehicle, and in the peculiar construction of the brake itself. This brake is especially adapted to be used in connection with the draft mechanism set forth in the application for Letters Patent filed herewith by Charles S. Chamberlain, but is equally applicable to any other draft mechanism.

In the drawings, Figure 1 is a side view of a vehicle provided with this improved brake, and Fig. 2 is a bottom view thereof.

Like letters designate corresponding parts in both of the figures.

A A are the wheels, B the front axle, C the back axle, D the reach, and E the king-bolt, of a four-wheeled vehicle.

F F are the hounds, G the draft-bar, H the holdback-frame pivoted to the draft-bar so as to oscillate within limits, and I the downwardly-projecting brake-operating arm, which parts are the same as the corresponding parts set forth in the above-mentioned application of Charles S. Chamberlain.

J is a long brake-rod which is situated immediately beneath the reach D, and is held by slotted guide-plates *a a* on the reach and front axle. This brake-rod is capable of being moved back and forward on the guide-plates to set and release the brakes. It is usually located immediately beneath the king-bolt E, which passes through a slot, *b*, therein, the length of said slot limiting the movement of the rod in either direction. Forward of the front axle a link, K, is pivoted to the brake-rod, and through an aperture in this link the operating-arm I of the holdback-frame is inserted. The link K is pivoted to enable the brake to be operated in whatever position the front axle may be turned. The brake-rod is normally held in its extreme rearward position by a coiled spring, L, which surrounds the rod, and acts against one of the fixed guide-plates *a*, and a stop, *c*, fixed to the brake-rod.

The brakes themselves consist of collars M M, which surround the rear axle and slide thereon. These collars are provided with elastic (preferably rubber) brake-faces N N, which are adapted to bear against the inner ends of the hubs of the wheel, and thus retard the rotation of the same. To the inner sides of the brake-collars are secured arms O O, which slide in guides *d d* on the under side of the back axle. Pivoted at one end of each of these arms O is a connecting toggle-arm, P, which extends backwardly in an angular direction, and at its rear end is pivoted to the rear end of the brake-rod J. The brakes are normally held out of contact with the wheel-hubs by means of their connection with the brake-rod. When, however, the brake-rod is moved forward, the brakes are, through the instrumentality of the toggle-arms, applied against the inner ends of the hubs, thus retarding their motion, or entirely locking them, according to the amount of force applied. The holdback-frame H, with its arm I, automatically moves the brake-rod forward, and thus applies the brake. Any backward movement of the frame H will move the lower end of the arm I forward, which, being connected to the brake-rod, moves it forward and so applies the brakes. When the vehicle runs forward too rapidly, or the horse is held in to stop the vehicle, the holdback-frame is moved backward, and thus the brakes are applied.

Besides the automatic device for applying the brakes, they may also be applied by hand. Beneath the vehicle-body a rock-shaft, Q, is mounted, to which an operating hand-lever, R, is attached. Two depending arms, S S, secured to the shaft near its center, embrace the reach, and are pivotally secured to a short cross-bar, T, attached to the brake-rod. These arms are provided with slots e e, in which the cross-bar T is held, so that the brake-rod may be operated by the holdback-frame without affecting the rock-shaft Q. A backward pull on the handle R moves the brake-rod forward and applies the brakes.

We claim as our invention—

The axle and wheel-hubs of a vehicle, brake-collars which slide longitudinally upon said axle and engage the inner ends of said hubs, a sliding brake-rod, toggle-arms which connect said collars and brake-rod, and a spring which holds said brake-rod in such a position that the brake-collars are disengaged from the hubs, in combination with an oscillating holdback-frame pivoted to the vehicle in the rear of the horse, and which is adapted to come in contact with the back of the horse above the pivotal point, and a brake-operating arm rigidly secured to said holdback-frame below its pivotal point, and connected at its lower end with the sliding brake-rod, substantially as set forth, whereby when the holdback-frame comes in contact with the back of the horse the brake-rod will be moved forward and apply the brakes.

In testimony whereof we affix our signatures in presence of two witnesses.

CHARLES S. CHAMBERLAIN.
JEREMIAH MILLER.

Witnesses to the signature of Charles S. Chamberlain:
 W. E. ZIMMERMAN,
 GEO. W. JOHN.
Witnesses to the signature of Jeremiah Miller:
 WALTER B. CRAIG,
 A. S. BROWNE.